(12) United States Patent
Arai et al.

(10) Patent No.: US 11,753,328 B2
(45) Date of Patent: Sep. 12, 2023

(54) METHOD AND DEVICE FOR SCREENING OPTICAL FIBER CORE, AND METHOD FOR MANUFACTURING OPTICAL FIBER CORE

(71) Applicant: FURUKAWA ELECTRIC CO., LTD., Tokyo (JP)

(72) Inventors: Shinichi Arai, Tokyo (JP); Shigeto Matsumoto, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 303 days.

(21) Appl. No.: 16/894,982

(22) Filed: Jun. 8, 2020

(65) Prior Publication Data

US 2020/0299178 A1    Sep. 24, 2020

Related U.S. Application Data

(63) Continuation of application No. PCT/JP2018/046090, filed on Dec. 14, 2018.

(30) Foreign Application Priority Data

Dec. 15, 2017  (JP) .................................. 2017-240321

(51) Int. Cl.
*C03B 37/12* (2006.01)
*C03C 25/105* (2018.01)
*G02B 6/02* (2006.01)

(52) U.S. Cl.
CPC ............ *C03B 37/12* (2013.01); *C03C 25/105* (2013.01); *G02B 6/02395* (2013.01)

(58) Field of Classification Search
CPC .................................................... C03B 37/12
See application file for complete search history.

(56) References Cited

U.S. PATENT DOCUMENTS 4,957,364 A    9/1990   Chesler
5,076,104 A   12/1991   Glaesemann et al.
(Continued)

FOREIGN PATENT DOCUMENTS

CN          1471635 A     1/2004
CN        101379381 A     3/2009
(Continued)

OTHER PUBLICATIONS

Extended European Search Report dated Aug. 10, 2021 in corresponding European Patent Application No. 18887703.9, 7 pages.
(Continued)

*Primary Examiner* — Cynthia Szewczyk
(74) *Attorney, Agent, or Firm* — Oblon, McClelland, Maier & Neustadt, L.L.P.

(57) ABSTRACT

A method for screening an optical fiber core including a resin coating layer, includes: a pre-strain applying step of adding a tensile force while feeding a portion of the optical fiber core retained at both ends of the portion, and applying a pre-tensile strain larger than zero and smaller than a guaranteed tensile strain set as a guaranteed value; a guaranteed strain applying step of adding a tensile force while feeding the portion of the optical fiber core retained at both ends of the portion and applied with the pre-tensile strain, and applying the guaranteed tensile strain only for a predetermined time; and a guaranteed strain releasing step of releasing the optical fiber core from the guaranteed tensile strain.

10 Claims, 7 Drawing Sheets

(56) References Cited

U.S. PATENT DOCUMENTS

| | | |
|---|---|---|
| 2003/0011759 A1 | 1/2003 | Ravichandran et al. |
| 2013/0205912 A1 | 8/2013 | Yoshihara et al. |
| 2013/0298691 A1 | 11/2013 | Shimanuki |

FOREIGN PATENT DOCUMENTS

| | | | |
|---|---|---|---|
| CN | 201622208 U | 11/2010 | |
| CN | 101918808 A | 12/2010 | |
| CN | 104034582 A | 9/2014 | |
| CN | 105510008 A | 4/2016 | |
| CN | 105510133 A | 4/2016 | |
| CN | 106502192 A | 3/2017 | |
| EP | 1112979 A1 * | 7/2001 | ........... B65H 59/385 |
| EP | 2 235 498 A1 | 10/2010 | |
| JP | 50-137781 A | 11/1975 | |
| JP | 58-027042 A | 2/1983 | |
| JP | 58-28639 A | 2/1983 | |
| JP | 02-296129 A | 12/1990 | |
| JP | 5-170476 A | 7/1993 | |
| JP | 7-218452 A | 8/1995 | |
| JP | 09-079959 A | 3/1997 | |
| JP | 09-156949 A | 6/1997 | |
| JP | 9-318485 A | 12/1997 | |
| JP | 10-114537 A | 5/1998 | |
| JP | 11-83672 A | 3/1999 | |
| JP | 2000-143093 A | 5/2000 | |
| JP | 2005-162515 A | 5/2005 | |
| JP | 2006-350265 A | 12/2006 | |
| JP | 2014-157031 A | 8/2014 | |
| JP | 2015-137995 A | 7/2015 | |
| WO | WO 2017/159848 A1 | 9/2017 | |

OTHER PUBLICATIONS

International Search Report dated Mar. 19, 2019 in PCT/JP2018/046090 filed on Dec. 14, 2018, 2 pages.

Japanese Office Action dated Aug. 2, 2022 in Japanese Patent Application No. 2019-559225 (with English translation), 6 pages.

Combined Chinese Office Action and Search Report dated Aug. 26, 2022 in Chinese Patent Application No. 201880080593.3 (with unedited computer generated English translation), 20 pages.

Office Action dated Dec. 6, 2022 in corresponding Japanese Patent Application No. 2019-559225, 6 pages.

Office Action report dated Apr. 12, 2023, in corresponding Chinese Application No. 201880080593.3 with English machine translation thereof, citing refs. 1, 2 and 15-18, 10 pages.

* cited by examiner

METHOD AND DEVICE FOR SCREENING OPTICAL FIBER CORE, AND METHOD FOR MANUFACTURING OPTICAL FIBER CORE

CROSS-REFERENCE TO RELATED APPLICATION(S)

This application is a continuation of International Application No. PCT/JP2018/046090, filed on Dec. 14, 2018, the entire contents of which are incorporated herein by reference.

BACKGROUND

The present disclosure relates to a method and device for screening an optical fiber core, and a method for manufacturing an optical fiber core.

Optical fiber core wire generally includes a structure having a core and a resin coating layer formed over the outer circumference of the optical fiber including a cladding formed on the outer circumference of the core. Screening methods that guarantee the long-term mechanical reliability of the optical fiber core with this type of the resin coating layer include a screening method that adds a tensile force to the optical fiber cable wire and applies a tensile strain set as a guaranteed value (hereafter, written as a guaranteed tensile strain as appropriate) (see Japanese Laid-open Patent Publication No. H09-079959, Japanese Laid-open Patent Publication No. H09-156949). Applying this type of tensile strain to the optical fiber core causes wire breakage in portions with weak mechanical strength, and these portions are therefore eliminated from optical fiber core that will serve as the product. This type of screening method is called a proof test. One method to add tensile force to the optical fiber core is clamping by gripping a portion of the optical fiber core at both ends and applying a load between both ends.

SUMMARY

There is a need for providing a method and device for screening an optical fiber core, and a method for manufacturing an optical fiber core that can suppress occurrence of damage in resin coating layers.

According to an embodiment, a method for screening an optical fiber core including a resin coating layer according to an embodiment of the present disclosure, includes: a pre-strain applying step of adding a tensile force while feeding a portion of the optical fiber core retained at both ends of the portion, and applying a pre-tensile strain larger than zero and smaller than a guaranteed tensile strain set as a guaranteed value; a guaranteed strain applying step of adding a tensile force while feeding the portion of the optical fiber core retained at both ends of the portion and applied with the pre-tensile strain, and applying the guaranteed tensile strain only for a predetermined time; and a guaranteed strain releasing step of releasing the optical fiber core from the guaranteed tensile strain.

According to an embodiment, a device for screening an optical fiber core including a resin coating layer includes: a pre-strain applier that adds a tensile force while feeding a portion of the optical fiber core retained at both ends of the portion, and apples a pre-tensile strain larger than zero and smaller than a guaranteed tensile strain set as a guaranteed value; a guaranteed strain applier that is connected to the pre-strain applier, adds a tensile force while feeding the portion of the optical fiber core retained at both ends of the portion and applied with the pre-tensile force, and applies the guaranteed tensile strain only for a predetermined time; and a strain releaser that is connected to the guaranteed strain applier and releases the optical fiber core from the guaranteed tensile strain.

DETAILED DESCRIPTION

In the related art, in the case of applying a large tensile strain to the optical fiber core, when the tensile force applied to the optical fiber core suddenly changes, in some cases the resin coating layer of the optical fiber core may be damaged, causing loss of its function as a protective layer. Damage tends to easily occur during screening when applying a relatively large tensile strain for example in the case of the optical fiber core requiring high mechanical strength or in the case of the optical fiber core when the cladding diameter is larger than a 125 µm standard. The thinner diameter of the optical fiber core has resulted in resin coating layers that are thinner than the 125 µm standard so that breakage tends to occur at a relatively low tensile strain during screening of what is called a thin optical fiber core.

The embodiments of the present disclosure are herein after described while referring to the accompanied drawings. In these specifications, optical fiber core is a general term for an item including resin coating on the outer circumference of the optical fiber. The present disclosure is not limited by the following embodiments. Reference numerals are assigned as appropriate to the same or corresponding elements in each drawing.

First Embodiment

Figure 1:
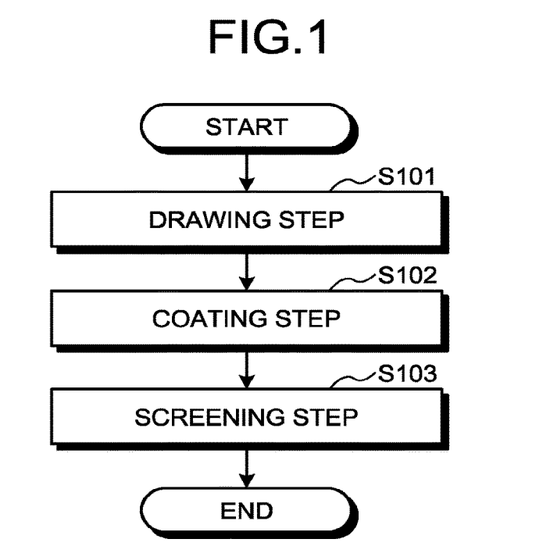
FIG. 1 is a flow chart illustrating the method for manufacturing an optical fiber core of a first embodiment.

FIG. 1 is a flow chart of the method for manufacturing an optical fiber core of a first embodiment. In the manufacturing method, a drawing step for drawing out the optical fiber from the optical fiber preform is performed in step S101. Next, in step S102, a coating step is performed to form a resin coating layer over the outer circumference of the drawn-out optical fiber and the optical fiber core is formed.

In step S103, a screening step is next performed on the optical fiber core that is formed. The optical fiber core serving as the product is in this way manufactured.

Figure 2:
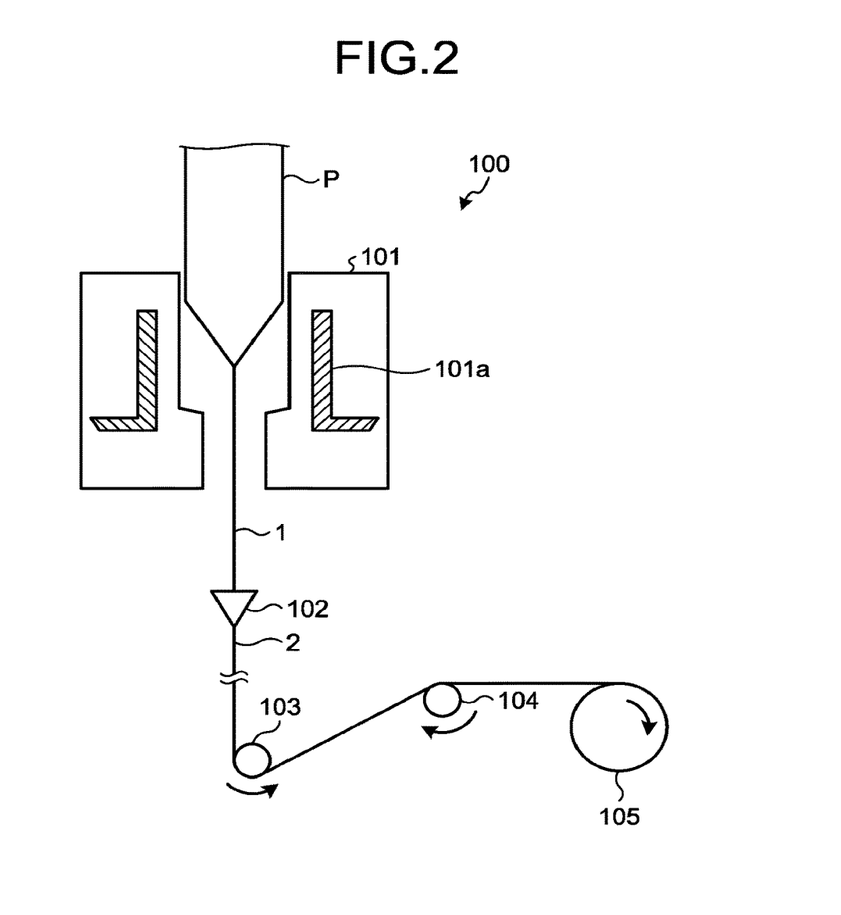
FIG. 2 is a drawing illustrating an optical fiber drawing out and coating device.

FIG. 2 is a drawing illustrating an optical fiber drawing out and coating device 100 utilized in the method for manufacturing the optical fiber core of the first embodiment. As illustrated in FIG. 2, a heater 101a in an optical fiber drawing furnace 101 heats and melts an optical fiber preform P at the bottom end to draw out an optical fiber 1. Subsequently, as the coating step, a coating former device 102 forms a resin coating layer on the outer circumference of the drawn out optical fiber 1 and forms an optical fiber core 2. The optical fiber core 2 is taken up by a capstan roller 103 and wound by a winding bobbin 105 via a guide roll 104.

Next, the screening step for the optical fiber core 2 is performed utilizing a screening device. The screening device of the second through the eighth embodiments is described hereafter.

Second Embodiment

Figure 3:
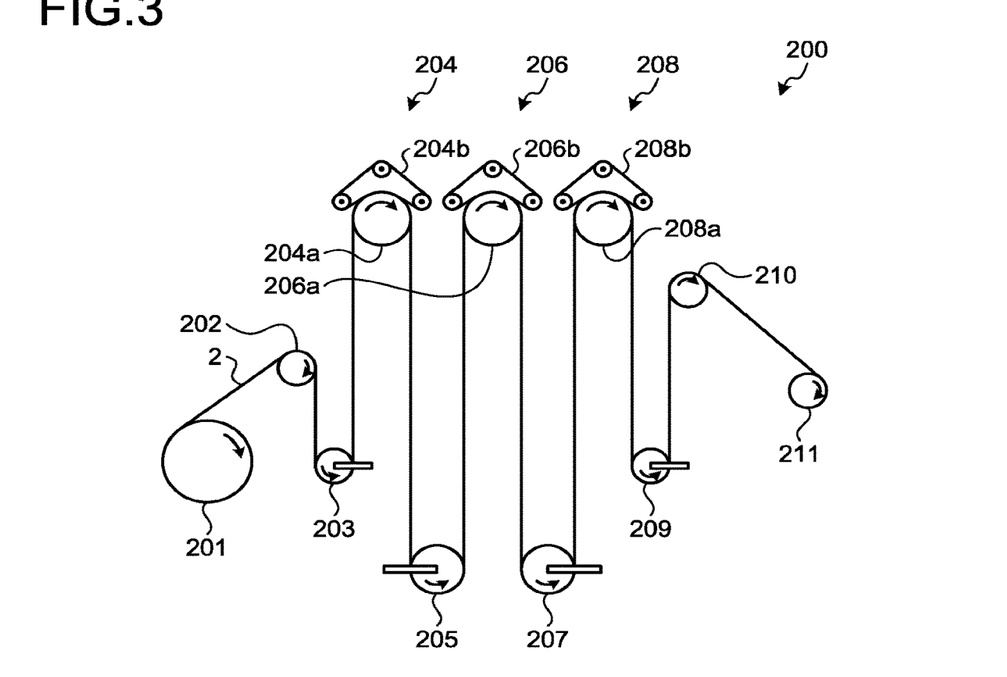
FIG. 3 is a schematic drawing of a screening device for the optical fiber core of a second embodiment.

FIG. 3 is a drawing of the screening device for the optical fiber core of a second embodiment. A screening device 200 includes a feed-out bobbin 201. The feed-out bobbin 201 winds up the optical fiber core 2 and feeds out the optical fiber core 2. The fed-out optical fiber core 2 sequentially passes along a pulley 202, a feed-out dancer 203, a retainer piece 204, a screening dancer 205, a retainer piece 206, a screening dancer 207, a retainer piece 208, a winder dancer 209, and a pulley 210 and is wound up along a winding bobbin 211.

The feed-out dancer 203 adds a slight tensile force so that the optical fiber core 2 is not loosened. The retainer piece 204 includes a capstan roller 204a and a retainer belt 204b that rotates by way of a roller, and encloses and retains the optical fiber core 2. The retainer piece 206 in the same way includes a capstan roller 206a and a retainer belt 206b that rotates by way of a roller, and encloses and retains the optical fiber core 2. The retainer piece 204 and the retainer piece 206 then retain both ends of a portion of the optical fiber core 2 and feed the portion of the optical fiber core 2.

The screening dancer 205 adds the tensile force by applying a load to the optical fiber core 2 that is retained at both ends by the retainer piece 204 and the retainer piece 206, and as the pre-strain applying step, applies a pre-tensile strain that is smaller than the guaranteed tensile strain set as the guaranteed value and larger than zero. The retainer piece 204, the screening dancer 205, and the retainer piece 206 are equivalent to a pre-strain applier.

The retainer piece 208 includes a capstan roller 208a and a retainer belt 208b that rotates by way of a roller. The retainer piece 206 and the retainer piece 208 retain both ends of a portion of the optical fiber core 2 and feed the portion of the optical fiber core 2. The screening dancer 207 adds the tensile force by applying a load to the optical fiber core 2 that is retained at both ends by the retainer piece 206 and the retainer piece 208, and applies the guaranteed tensile strain. The retainer piece 206, the screening dancer 207, and the retainer piece 208 are equivalent to a guaranteed strain applier and the screening is performed by way of this guaranteed strain applier. In other words, the guaranteed strain applier is connected to the above described pre-strain applier. A guaranteed tensile strain is applied to the optical fiber core 2 as the guaranteed strain applying step just during the time the optical fiber core 2 passes along the retainer piece 206 and the retainer piece 208, and the screening is performed on the optical fiber core 2.

As the strain releasing step, the optical fiber core 2 that passed along the retainer piece 208 is released from the tensile strain applied by the guaranteed strain applier for the screening. The retainer piece 208 is equivalent to a strain releaser. In other words, the strain releaser is connected to the above described guaranteed strain applier. The winder dancer 209 adds the slight tensile force so that the optical fiber core 2 that passed along the retainer piece 208 is not loosened.

The optical fiber core 2 wound by the winder dancer 209 is the optical fiber core serving as the screened product. The optical fiber core 2 that broke in the screening device 200 cannot satisfy the guaranteed values for tensile strain and so is excluded from products.

The feed speed of the optical fiber core 2 can be regulated by adjusting the rotation speed of the retainer pieces 204, 206, 208 and the winding bobbin 211 by way of a controller not illustrated in the drawings.

Figure 4A:
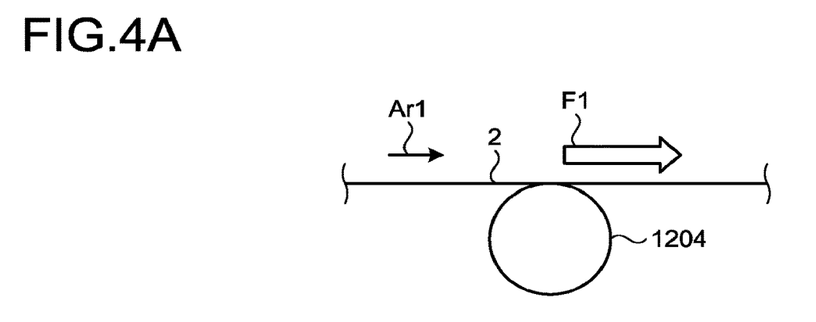
FIG. 4A is a schematic drawing describing a tensile force added to the optical fiber core in the screening device in the related art.
Figure 4B:
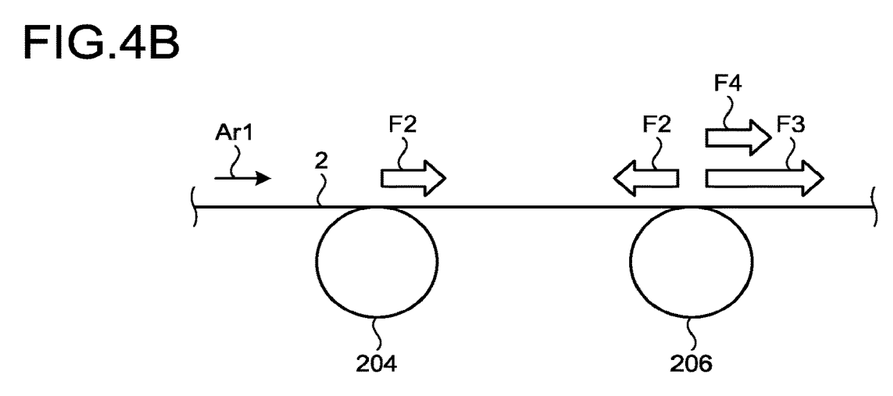
FIG. 4B is a schematic drawing describing the tensile force added to the optical fiber core in the screening device of the second embodiment.

Here, the tensile force added to the optical fiber core 2 is described while referring to FIG. 4A and FIG. 4B. In FIG. 4A and FIG. 4B a capstan roller is not illustrated in the drawings and the optical fiber core 2 is illustrated in a linear view. In the screening device in the related art as illustrated in FIG. 4A, a tensile force F1 for applying a guaranteed tensile strain (for example, a strain of 3.0%) is added by a retainer piece 1204 with the same structure as retainer piece 204, onto the optical fiber core 2 with almost no tensile strain proceeding from the feed bobbin side in the direction of arrow Ar1. As a result, the tensile force added to the optical fiber core 2 suddenly changes at the boundary with the retainer piece 1204 so that in some cases the resin coating layer of the optical fiber core 2 might lose its function as a protective layer.

In contrast, as illustrated in FIG. 4B, in the screening device 200 of the second embodiment, a tensile force F2 for applying the pre-tensile strain (for example, a strain of 1.5%) that is smaller than the guaranteed tensile strain is added between the retainer piece 204 and the retainer piece 206 onto the optical fiber core 2 with almost no tensile strain proceeding from the feed bobbin 201 side in the direction of arrow Ar1. The retainer piece 206 then adds a tensile force F3 for applying the guaranteed tensile strain (for example, a strain of 3.0%) onto the optical fiber core 2 receiving the applied pre-tensile strain. The retainer piece 206 in this way applies a large tensile force F3 onto the optical fiber core 2. However, the change at the boundary with the retainer piece 206 is a tensile force F4 that is the difference between the tensile force F3 and the tensile force F2 (for example, 3.0−1.5=1.5), and a sudden change in tensile force is suppressed. Therefore, damage to the resin coating layer of the optical fiber core 2 is suppressed.

The size of the pre-tensile strain can be set for example according to the size of the guaranteed tensile strain or the material properties and the thickness of the resin coating layer as appropriate for suppressing damage to the resin coating layer of the optical fiber core 2.

Third Embodiment

Figure 5:
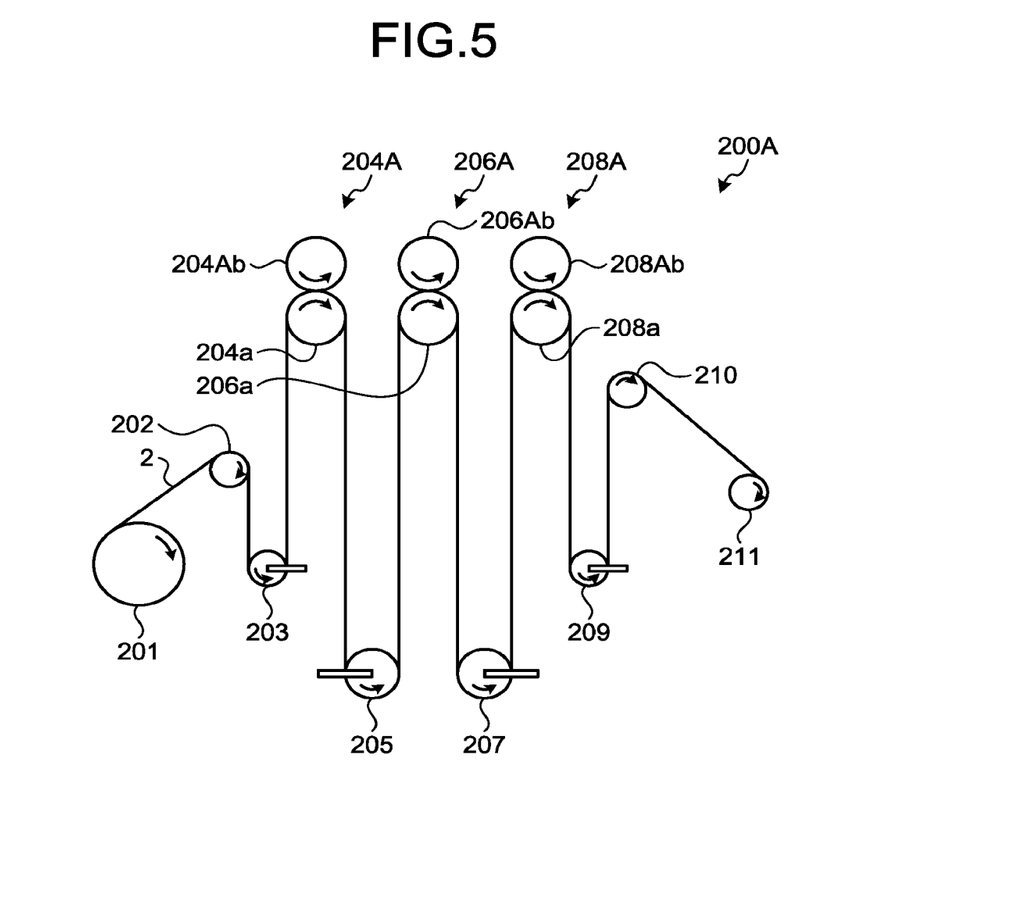
FIG. 5 is a schematic drawing of the screening device for the optical fiber core of a third embodiment.

FIG. 5 is a schematic drawing of the screening device for the optical fiber core of a third embodiment. A screening device 200A includes a structure that replaces the retainer pieces 204, 206, and 208 in the structure of the screening device 200 in FIG. 3, respectively with retainer pieces 204A, 206A, and 208A.

In the structure of the retainer pieces 204, 206, and 208, the retainer pieces 204A, 206A, and 208A include a structure that replaces retainer belts 204b, 206b, and 208b respectively with capstan rollers 204Ab, 206Ab, and 208Ab. In other words, this structure functions so that the retainer piece 204A encloses, clamps, and feeds the optical fiber core 2 by way of the pair of capstan rollers 204a, 204Ab. The retainer pieces 206A, 208A are in the same way, functions to enclose, clamp, and feed the optical fiber core 2 by way of the pair of capstan rollers 206a, 206Ab, and the pair of capstan rollers 208a, 208Ab.

The screening device 200A also adds the tensile force for applying the pre-tensile strain between the retainer piece 204A and the retainer piece 206A onto the optical fiber core 2 with almost no tensile strain and subsequently adds the tensile force for applying the guaranteed tensile strain between the retainer piece 206A and the retainer piece 208A. A sudden change in the tensile force on the optical fiber core 2 can in this way be suppressed and damage to the resin coating layer can be suppressed.

Fourth Embodiment

Figure 6:
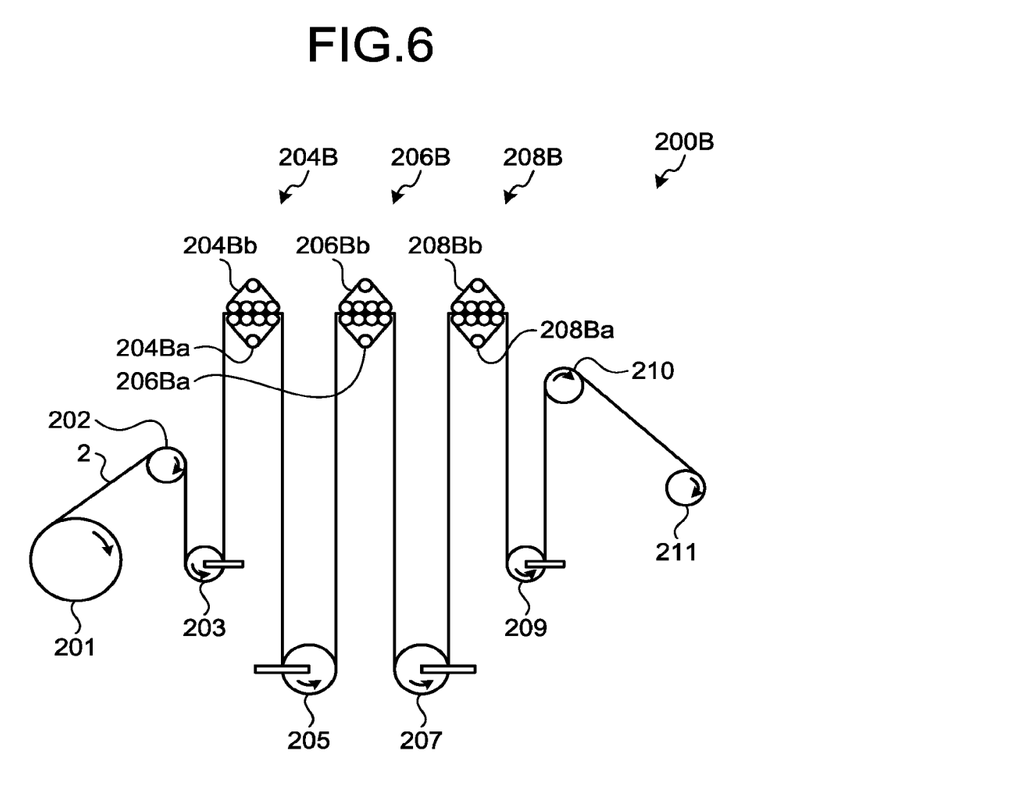
FIG. 6 is a schematic drawing of the screening device for the optical fiber core of a fourth embodiment.

FIG. 6 is a schematic drawing of the screening device for the optical fiber core of a fourth embodiment. In the structure of the screening device 200 illustrated in FIG. 3, a screening device 200B includes a structure that replaces the retainer pieces 204, 206, and 208 respectively with retainer pieces 204B, 206B and 208B.

The retainer piece 204B is structured so as to enclose, clamp, and feed the optical fiber core 2 by way of a pair of retainer belts 204Ba, 204Bb that rotate by way of the rollers. The retainer pieces 206B, 208B are in the same way, structured so as to respectively enclose, clamp, and feed the optical fiber core 2 by way of a pair of retainer belts 206Ba, 206Bb, and the pair of retainer belts 208Ba, 208Bb.

This screening device 200B also adds a tensile force for applying the pre-tensile strain between the retainer piece 204B and the retainer piece 206B to the optical fiber core 2 with almost no tensile strain and subsequently adds the tensile force for applying the guaranteed tensile strain between the retainer piece 206B and the retainer piece 208B. A sudden change in the tensile force on the optical fiber core 2 can in this way be suppressed and damage to the resin coating layer can be suppressed.

Fifth Embodiment

Figure 7:
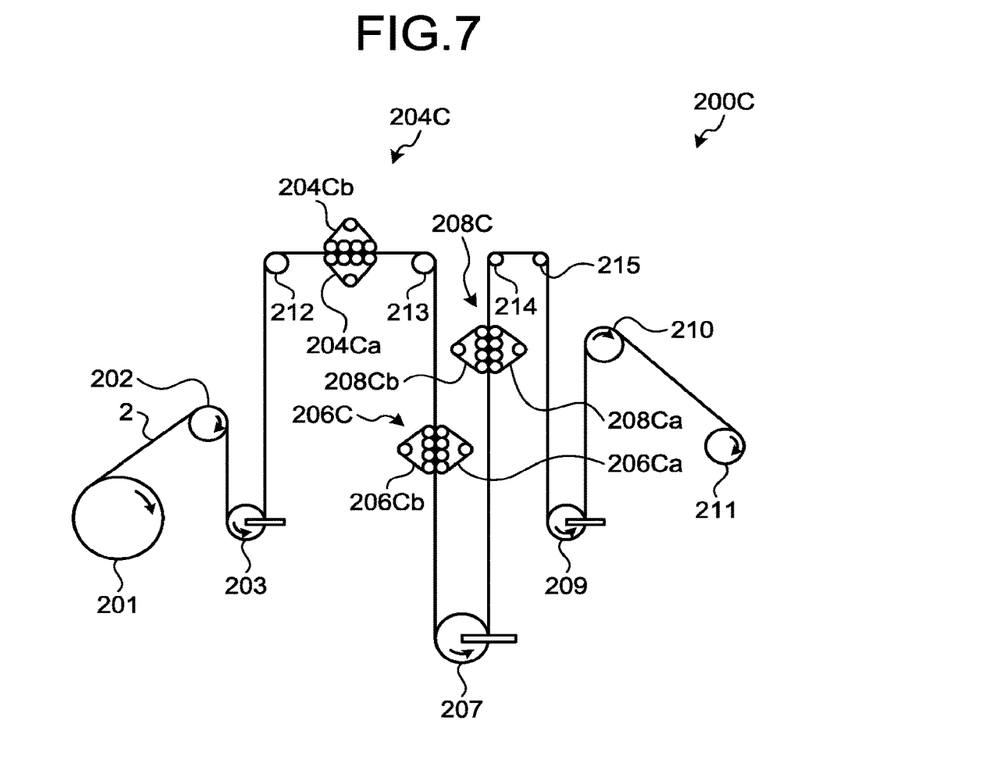
FIG. 7 is a schematic drawing of the screening device for the optical fiber core of a fifth embodiment.

FIG. 7 is a schematic drawing of the screening device for the optical fiber core of a fifth embodiment. In the structure of the screening device 200 illustrated in FIG. 3, a screening device 200C includes a structure that replaces the retainer pieces 204, 206, and 208 respectively with retainer pieces 204C, 206C, and 208C, adds rollers 212, 213, 214, and 215, and omits the screening dancer 205.

The retainer piece 204C is structured so as to enclose, clamp and feed the optical fiber core 2 by way of a pair of retainer belts 204Ca, 204Cb that rotate by way of rollers. The retainer pieces 206C and 208C are in the same way, structured so as to respectively enclose, clamp, and feed the optical fiber core 2 by way of a pair of retainer belts 206Ca, 206Cb, and a pair of retainer belts 208Ca, 208Cb.

This screening device 200C applies a pre-tensile strain onto the optical fiber core 2 between the retainer piece 204C and the retainer piece 206C by adding a difference in rotation speed between the retainer piece 204C and the retainer piece 206C. Specifically, by setting the rotation speed of the retainer piece 206C faster than the rotation speed of the retainer piece 204C, the tensile force is added onto the optical fiber core 2 according to the difference in the rotation speed, and the pre-tensile strain is in this way applied.

The rollers 212, 213, 214, and 215 are installed in order to change the feed direction of the optical fiber core 2. Preferably, a load sensor such as a load cell is mounted in the roller 213 between the retainer piece 204C and the retainer piece 206C to detect the pre-tensile strain applied to the optical fiber core 2.

This screening device 200C also adds a tensile force for applying the pre-tensile strain between the retainer piece 204C and the retainer piece 206C onto the optical fiber core 2 with almost no tensile strain, and subsequently adds a tensile force for applying the guaranteed tensile strain between the retainer piece 206C and the retainer piece 208C by way of the screening dancer 207. A sudden change in the tensile force on the optical fiber core 2 can in this way be suppressed and damage to the resin coating layer can be suppressed.

The difference in the rotation speed is added between the retainer piece 206C and the retainer piece 208C, and by adding the tensile force generated by this difference in the rotation speed to the tensile force generated by the load from the screening dancer 207 the guaranteed tensile strain may be applied.

Sixth Embodiment

Figure 8:
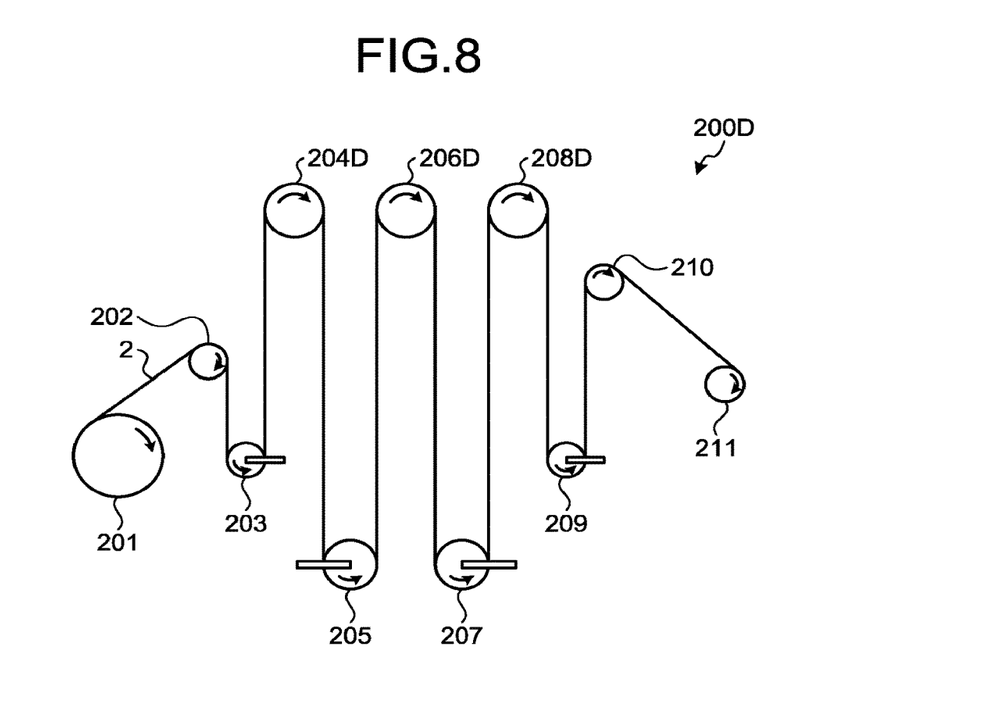
FIG. 8 is a schematic drawing of the screening device for the optical fiber core of a sixth embodiment.

FIG. 8 is a schematic drawing of the screening device for the optical fiber core of a sixth embodiment. In the structure of the screening device 200 illustrated in FIG. 3, a screening device 200D includes a structure that replaces the retainer pieces 204, 206, and 208 respectively with retainer pieces 204D, 206D, and 208D.

The retainer piece 204D includes a capstan roller having a high friction coefficient with the outer circumferential surface lined with silicone or the like. The frictional force acting between the outer circumferential surface and the optical fiber core 2 installed along the outer circumferential surface functions to clamp and feed the optical fiber core 2. The retainer pieces 206D and 208D include the capstan roller having a high friction coefficient with the outer circumferential surface lined and are structured so as to clamp and feed the optical fiber core 2 by the frictional force.

This screening device 200D also adds a tensile force for applying a pre-tensile strain between the retainer piece 204D and the retainer piece 206D onto the optical fiber core 2 with almost no tensile strain and subsequently adds a tensile force for applying the guaranteed tensile strain between the retainer piece 206D and the retainer piece 208D. A sudden change in the tensile force on the optical fiber core 2 can in this way be suppressed and damage to the resin coating layer can be suppressed.

Seventh Embodiment

Figure 9:
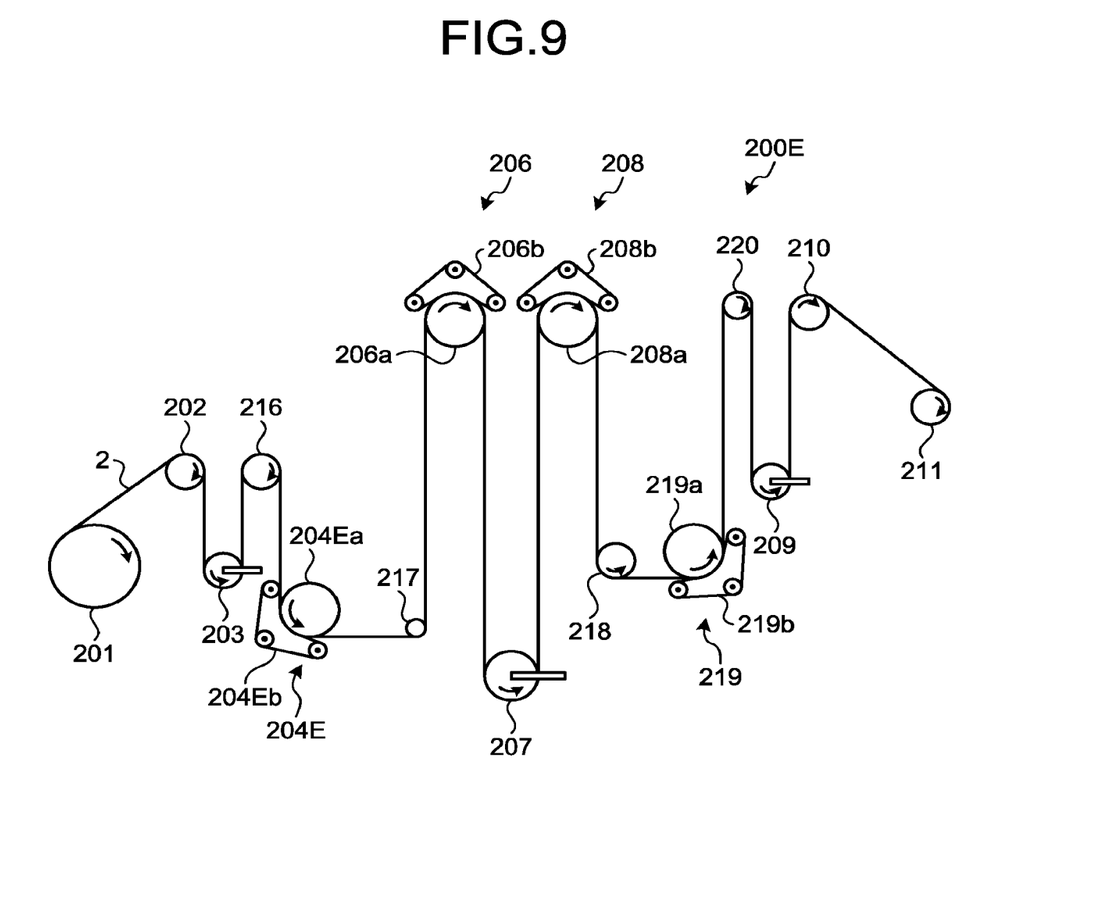
FIG. 9 is a schematic drawing of the screening device for the optical fiber core of a seventh embodiment.

FIG. 9 is a schematic drawing of screening device 200E for the optical fiber core of a seventh embodiment. In the structure of the screening device 200 illustrated in FIG. 3, a screening device 200E includes a structure that replaces the retainer piece 204 with retainer piece 204E and adds a retainer piece 219 and rollers 216, 217, 218, and 220.

The retainer piece 204E includes a capstan roller 204Ea and a retainer belt 204Eb that rotate by way of rollers, and encloses and retains the optical fiber core 2. The retainer piece 219 in the same way includes a capstan roller 219a and a retainer belt 219b that rotates by way of a roller, and encloses and retains the optical fiber belt 2.

In this screening device 200E, the pre-tensile strain is applied to the optical fiber core 2 between the retainer piece 204E and the retainer piece 206 by adding the difference in the rotation speed between the retainer piece 204E and the retainer piece 206.

Furthermore, in the screening device 200E, the optical fiber core 2 is released stepwise from the guaranteed tensile strain applied between the retainer piece 206 and the retainer piece 208. Specifically, by adding the difference in the rotation speed between the retainer piece 208 and the retainer piece 219, the tensile strain applied to the optical fiber core 2 is reduced (first stage release), and next the optical fiber core 2 is released from tensile strain by passing the retainer piece 219 (second stage release). In other words, in the screening device 200E, the guaranteed tensile strain is released in two stages.

The rollers 216, 217, 218, and 220 are installed in order to change the feed direction of the optical fiber core 2. Preferably, a load sensor such as a load cell is mounted in the roller 217 installed between the retainer piece 204E and the retainer piece 206 to detect the pre-tensile strain applied to the optical fiber core 2. In the same way, a load sensor such as a load cell is preferably mounted in the roller 218 between the retainer piece 208 and the retainer piece 219 to detect the reduced tensile strain.

This screening device 200E also adds the tensile force for applying the pre-tensile strain between the retainer piece 204E and the retainer piece 206 onto the optical fiber core 2 with almost no tensile strain and subsequently adds the tensile force for applying the guaranteed tensile strain between the retainer piece 206 and the retainer piece 208. A sudden change in the tensile force on the optical fiber core 2 can in this way be suppressed and damage to the resin coating layer can be suppressed.

Furthermore, this screening device 200E releases the guaranteed tensile strain in two stages at the retainer piece 208 and the retainer piece 219. When releasing the optical fiber core 2 from the guaranteed tensile strain, peeling of the resin coating layer may occur due to sudden changes in the tensile force added to the optical fiber core 2 when the guaranteed tensile force is large. However, performing the release stepwise in this way is preferable since occurrence of peeling can be suppressed.

Eighth Embodiment

Figure 10:
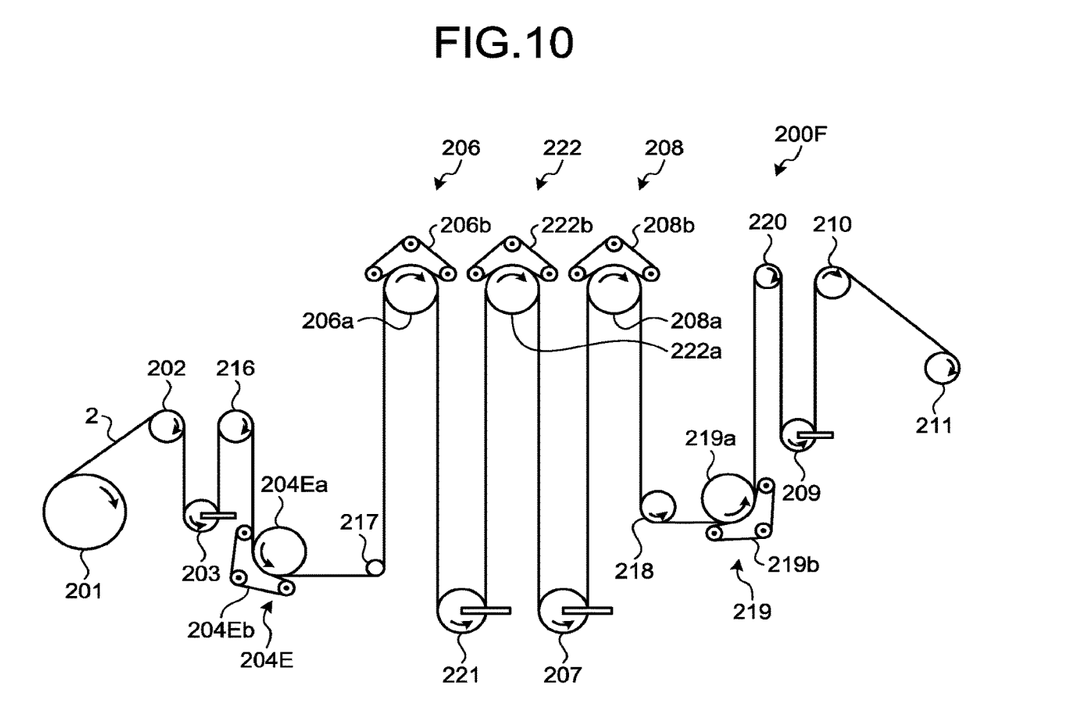
FIG. 10 is a schematic drawing of the screening device for the optical fiber core of an eighth embodiment.

FIG. 10 is a schematic drawing of the screening device for the optical fiber core of an eighth embodiment. A screening device 200F is essentially the structure for the screening device 200E illustrated in FIG. 9, and additionally includes a screening dancer 221 and a retainer piece 222.

A retainer 222 includes a capstan roller 222a, and a retainer belt 222b that rotates by way of a roller, and encloses and retains the optical fiber core 2.

In this screening device 200F, the pre-tensile strain is applied by applying the tensile strain stepwise. Specifically, tensile strain is applied to the optical fiber core 2 between the retainer piece 204E and the retainer piece 206 by adding the difference in the rotation speed between the retainer piece 204E and the retainer piece 206 (first stage application of tensile strain). Furthermore, the screening dancer 221 adds the tensile force by applying a load onto the optical fiber core 2 retained at both ends by the retainer piece 206 and the retainer piece 222 so as to apply the tensile strain (second stage application of tensile strain). The pre-tensile strain is in this way applied to the optical fiber core 2. Afterwards, the tensile force is added to the optical fiber core 2 retained at both ends by the retainer piece 222 and the retainer piece 208 by adding a load by the screening dancer 207 so that the guaranteed tensile strain is applied.

This screening device 200F also adds the tensile force for applying the pre-tensile strain stepwise between the retainer piece 204E and the retainer piece 206, and between the retainer piece 206 and the retainer piece 222 onto the optical fiber core 2 with almost no tensile strain, and subsequently adds a tensile force for applying the guaranteed tensile strain between the retainer piece 222 and the retainer piece 208. In this way, for example, when the guaranteed tensile strain is large, a sudden change in the tensile force on the optical fiber core 2 can be suppressed more than the case of applying a pre-tensile strain at one stage, and damage to the resin coating layer can be suppressed.

Furthermore, this screening device 200F can also suppress occurrence of peeling in the resin coating layer since the guaranteed tensile strain is released in the two stages.

Release of the pre-tensile strain and the guaranteed tensile strain is not limited to two stages and three stages or more may be employed.

When applying the pre-tensile strain in N stages (N is an integer of 2 or more), with the slight tensile force added to the optical fiber core 2 by the feed-out dancer 203 set as 0, and the tensile force added at the n-th stage (n is an integer of 1 or more and less than N) is set to the tensile force n, the tensile force is preferably added so as to achieve the relationship of (tensile force 1−tensile force 0)>(tensile force (n+1)−tensile force n) prior to applying the pre-tensile force. The tensile force 0 is extremely small compared to the tensile force n, so a tensile force that achieves the relationship of (tensile force 1)>(tensile force (n+1)−tensile force n) can be applied. By performing as described above, a relatively large tensile strain is applied at an early stage so that the optical fiber core 2 that cannot withstand this relatively large tensile strain will break at the early stage and can be removed. The optical fiber core 2 can break at a position far from the winding bobbin 211. In this way, damage due to the optical fiber core 2 breaking in a state with tensile force applied, moving out of control, reaching a good optical fiber core 2 wound on the winding bobbin 211, striking its surface and causing damage from so-called fiber rapping can be suppressed. Also, fragments occurring due to breakage can be prevented from reaching good optical fiber core 2.

Example 1

An optical fiber including quartz-clad with an outer diameter of 125 μm was drawn out from optical fiber preform, and on its outer circumference, an optical fiber core with an outer diameter of 245 μm including a UV-curable urethane acrylate resin having a dual-layer structure of a soft layer and a hard layer was formed. A sample 50 km in length was cut out from the above formed optical fiber core and the screening of the sample was performed utilizing the screening device having the structure illustrated in FIG. 3. The tensile strain by the tensile force added by the feed-out dancer was set to approximately 0%, the pre-tensile strain was set to 1.6%, and the guaranteed tensile strain was set to 3.0°. Namely, the amount of change in tensile strain during application of the tensile strain was 1.6% and 1.4°. During release of the tensile strain, the guaranteed tensile strain was released from 3.0% to approximately 0%. No breakage of the optical fiber core was observed in the 3.0% screening. No abnormalities were found when utilizing a surface unevenness detector to check for coating outer diameter abnormalities in the optical fiber core after the screening. When 1% screening such that a guaranteed tensile strain was set to 1.0% without applying the pre-tensile strain (in other words, set to a pre-tensile strain of zero) was performed on the 3% screened optical fiber core, no breakage was observed.

Comparative Example 1

A separate sample of 50 km in length was cut out from the optical fiber core formed in the example 1 and the screening was performed on this sample utilizing a screening device in the related art applying no pre-tensile strain. The same guaranteed tensile strain of 3.0% as the example 1 was set so there was a sudden change in the tensile strain from approximately 0% to 3.0%. During release of the tensile strain, the guaranteed tensile strain was released from 3.0% to approximately 0%. No breakage of the optical fiber core was observed in the 3% screening. However, when utilizing the surface unevenness detector to check for coating outer diameter abnormalities on the optical fiber core after the screening, outer diameter abnormalities to a certain length were found at 5 locations among the 50 km. Breakage of the optical fiber core also occurred when 1% screening was performed on the 3% screened optical fiber core. The breakage locations were along the portions with the outer diameter abnormalities. When the outer diameter abnormalities including the breakage locations were cut out and observed in detail, breakage and tearing of the resin coating layer were confirmed in the portions with the outer diameter abnormalities.

Example 2

A separate sample of 50 km in length was cut out from the optical fiber core formed in the example 1, and the screening was performed utilizing the screening device with the structure illustrated in FIG. 5. The tensile strain applied by the feed-out dancer was set to approximately 0%, the pre-tensile strain was set to 1.6%, and the guaranteed tensile strain was set to 3.0%, the same as in the example 1. Namely, the amount of change in the tensile strain was 1.6% and 1.4%. During release of the tensile strain, the guaranteed tensile strain was released from 3.0% to approximately 0%. No breakage of the optical fiber core was observed in the 3% screening. No abnormalities were found when utilizing the surface unevenness detector to check for coating outer diameter abnormalities in the optical fiber core after the screening. When 1% screening was performed on the 3% screened optical fiber core the same as in the example 1, no breakage was observed.

Example 3

A separate sample of 50 km in length was cut out from the optical fiber core formed in the example 1, and the screening was performed utilizing the screening device with the structure illustrated in FIG. 6. The tensile strain applied by the feed-out dancer was set to approximately 0%, the pre-tensile strain was set to 1.6%, and the guaranteed tensile strain was set to 3.0%, the same as in the example 1. During release of the tensile strain, the guaranteed tensile strain was released from 3.0% to approximately 0%. No breakage of the optical fiber core was observed in the 3% screening. No abnormalities were found when utilizing the surface unevenness detector to check for coating outer diameter abnormalities in the optical fiber core after the screening. When the 1% screening was performed on the 3% screened optical fiber core the same as in the example 1, no breakage was observed.

Example 4

A separate sample of 50 km in length was cut out from the optical fiber core formed in the example 1, and the screening was performed utilizing the screening device with the structure illustrated in FIG. 8. The tensile strain applied by the feed-out dancer was set to approximately 0%, the pre-tensile strain was set to 1.6%, and the guaranteed tensile strain was set to 3.0%, the same as in the example 1. During release of the tensile strain, the guaranteed tensile strain was released from 3.0% to approximately 0%. No breakage of the optical fiber core was observed in the 3% screening. No abnormalities were found when utilizing the surface unevenness detector to check for coating outer diameter abnormalities in the optical fiber core after the screening. When the 1% screening was performed on the 3% screened optical fiber core the same as in the example 1, no breakage was observed.

Example 5

An optical fiber including quartz-clad with an outer diameter of 80 μm was drawn out from optical fiber preform, and on its outer circumference, a thin optical fiber core with an outer diameter of 125 μm that includes a UV-curable urethane acrylate resin having a dual-layer structure of a soft layer and a hard layer was formed. A sample 50 km in length was cut out from the above formed optical fiber core and the screening of the sample was performed utilizing the screening device having the structure illustrated in FIG. 9. The tensile strain applied by the feed-out dancer to the optical fiber core with an outer diameter of 125 μm was set to approximately 0%, the pre-tensile strain was set to 0.5%, and the guaranteed tensile strain was set to 1.0%. Namely, the amount of change in the tensile strain during application of the tensile strain was 0.5%. During release of the tensile strain, the guaranteed tensile strain was released from 1.0% first of all to 0.5%, and then to approximately 0%. No breakage of the optical fiber core was observed in the 1% screening. No abnormalities were found when utilizing the surface unevenness detector to check for coating outer diameter abnormalities in the optical fiber core after the screening. When the 1% screening was performed on the 1% screened optical fiber core the same as in the example 1, no breakage was observed.

Example 6

An optical fiber including quartz-clad with an outer diameter of 80 μm was drawn out from quarts-clad optical fiber preform, and on its outer circumference, a thin optical fiber core with an outer diameter of 140 μm that includes a UV-curable urethane acrylate resin having a dual-layer structure of a soft layer and a hard layer was formed. A sample 50 km in length was cut out from the above formed optical fiber core and the screening of the sample was performed utilizing the screening device having the structure illustrated in FIG. 9. The tensile strain applied by the feed-out dancer to the optical fiber core with an outer diameter of 140 μm was set to approximately 0°, the pre-tensile strain was set to 0.7°, and the guaranteed tensile strain was set to 2.0°. Namely, the amount of change in the tensile strain during application of the tensile strain was 1.3%. During release of the tensile strain, the guaranteed tensile strain was released from 2.0% first of all to 0.7%, and then to approximately 0%. No breakage of the optical fiber core was observed in the 2% screening. No abnormalities were found when utilizing the surface unevenness detector to check for coating outer diameter abnormalities in the optical fiber core after the screening. When the 1% screening was performed on the 2% screened optical fiber core the same as in the example 1, no breakage was observed.

Example 7

An optical fiber including quartz-clad with an outer diameter of 80 μm was drawn out from quarts-clad optical fiber preform, and on its outer circumference, a thin optical fiber core with an outer diameter of 160 μm that includes a UV-curable urethane acrylate resin having a dual-layer structure of a soft layer and a hard layer was formed. A sample 50 km in length was cut out from the above formed optical fiber core and the screening of the sample was performed utilizing the screening device having the structure illustrated in FIG. 9. The tensile strain applied by the feed-out dancer to the optical fiber core with an outer diameter of 160 μm was set to approximately 0%, the pre-tensile strain was set to 1.2%, and the guaranteed tensile strain was set to 3.0%. Namely, the amount of change in the tensile strain during application of the tensile strain was 1.8%. During release of the tensile strain, the guaranteed tensile strain was released from 3.0% first of all to 1.7%, and then to approximately 0%. No breakage of the optical fiber core was observed in the 3% screening. No abnormalities were found when utilizing the surface unevenness detector to check for coating outer diameter abnormalities in the optical fiber core after the screening. When the to screening the same as in the example 1 was performed on the 3% screened optical fiber core, no breakage was observed.

Example 8

An optical fiber including quartz-clad with an outer diameter of 250 μm was drawn out from optical fiber preform, and on its outer circumference, a large diameter optical fiber core with an outer diameter of 370 μm that includes a UV-curable urethane acrylate resin having a dual-layer structure of a soft layer and a hard layer was formed. A sample 25 km in length was cut out from the above formed optical fiber core and the screening of the sample was performed utilizing the screening device having the structure illustrated in FIG. 10. The tensile strain applied by the feed-out dancer to the optical fiber core with an outer diameter of 370 μm was set to approximately 0%, the pre-tensile strain was set stepwise from 0.7% to 1.3%, and the guaranteed tensile strain was set to 1.9%. Namely, the amount of change in the tensile strain during application of the tensile strain was 0.7%, 0.6%, and 0.6%. During release of the tensile strain, the guaranteed tensile strain was released from 1.9%, first of all to 1.0% and then to approximately 0%. No breakage of the optical fiber core was observed in the 1.9% screening. No abnormalities were found when utilizing the surface unevenness detector to check for coating outer diameter abnormalities in the optical fiber core after the screening. When the 1% screening the same as in the example 1 was performed on the 1.9% screened optical fiber core, no breakage was observed.

Example 9

An optical fiber including quartz-clad with an outer diameter of 250 μm was drawn out from optical fiber preform, and on its outer circumference, a large diameter optical fiber core with an outer diameter of 450 μm that includes a resin triple-layer structure of polyimide, silicone, and nylon was formed. A sample 10 km in length was cut out from the above formed optical fiber core and the screening of the sample was performed utilizing the screening device having the structure illustrated in FIG. 10. The tensile strain applied by the feed-out dancer to the optical fiber core with an outer diameter of 450 μm was set to approximately 0%, the pre-tensile strain was set stepwise from 0.6% to 1.1%, and the guaranteed tensile strain was set to 1.5%. Namely, the amount of change in the tensile strain during application of the tensile strain was 0.6%, 0.5%, and 0.4%. During release of the tensile strain, the guaranteed tensile strain was released from 1.5%, first of all to 0.6%, and then to approximately 0%. No breakage of the optical fiber core was observed in the 1.5% screening. No abnormalities were found when utilizing the surface unevenness detector to check for coating outer diameter abnormalities in the optical fiber core after the screening. Additionally, when utilizing an optical time domain reflectometer (OTDR) device to check the light transmission state of the optical fiber core after the screening, no abnormalities were found across the entire length. When the 1% screening the same as in the example 1 was performed on the 1.5% screened optical fiber core, no breakage was observed. When utilizing the OTDR device to check the light transmission state of the optical fiber core after the screening, no abnormalities were found across the entire length.

Example 10

An optical fiber including quartz-clad with an outer diameter of 350 μm was drawn out from optical fiber preform, and on its outer circumference, a large diameter optical fiber core with an outer diameter of 550 μm that includes a resin dual-layer structure of polyimide/PFA (perfluoroalkoxy fluororesin: tetrafluoroethylene-perfluoroalkyl vinyl ether copolymer) was formed. A sample 15 km in length was cut out from the above formed optical fiber core and the screening of the sample was performed utilizing the screening device having the structure illustrated in FIG. 10. The tensile strain applied by the feed-out dancer to the optical fiber core with an outer diameter of 550 μm was set to approximately 0%, the pre-tensile strain was set stepwise from 0.5% to 1.1%, and the guaranteed tensile strain was set to 1.5%. Namely, the amount of change in the tensile strain during application of the tensile strain was 0.5%, 0.6%, and 0.4%. During release of the tensile strain, the guaranteed tensile strain was released from 1.5%, first of all to 0.6%, and then to approximately 0%. No breakage of the optical fiber core was observed in the 1.5% screening. No abnormalities were found when utilizing the surface unevenness detector to check for coating outer diameter abnormalities in the optical fiber core after the screening. Additionally, when utilizing the OTDR device to check the light transmission state of the optical fiber core after the screening, no abnormalities were found across the entire length. When 1% screening the same as in the example 1 was performed on the 1.5% screened optical fiber core, no breakage was observed. When utilizing the OTDR device to check the light transmission state of the optical fiber core after the screening, no abnormalities were found across the entire length.

Example 11

An optical fiber including quartz-clad with an outer diameter of 450 μm was drawn out from optical fiber preform, and on its outer circumference, a large diameter optical fiber core with an outer diameter of 900 μm that includes a resin triple-layer structure of polyimide/silicone/nylon was formed. A sample 10 km in length was cut out from the above formed optical fiber core and the screening of the sample was performed utilizing the screening device having the structure illustrated in FIG. 10. The tensile strain applied by the feed-out dancer to the optical fiber core with an outer diameter of 900 μm was set to approximately 0%, the pre-tensile strain was set stepwise from 0.5% to 0.9%, and the guaranteed tensile strain was set to 1.2%. Namely, the amount of change in the tensile strain during application of the tensile strain was 0.5%, 0.4%, and 0.3%. During release of the tensile strain, the guaranteed tensile strain was released from 1.2%, first of all to 0.6%, and then to approximately 0%. No breakage of the optical fiber core was observed in the 1.2% screening. No abnormalities were found when utilizing a surface unevenness detector to check for coating outer diameter abnormalities in the optical fiber core after the screening. Additionally, when utilizing the OTDR device to check the light transmission state of the optical fiber core after the screening, no abnormalities were found across the entire length. When the 1% screening the same as in the example 1 was performed on the 1.2% screened optical fiber core, no breakage was observed. When utilizing the OTDR device to check the light transmission state of the optical fiber core after the screening, no abnormalities were found across the entire length.

The present disclosure is not limited by the above described embodiments. The present disclosure may also be achieved including appropriate combinations of the above described structural elements. For example, in the screening device 200E illustrated in FIG. 9, any of the retainer pieces 204E, 206, 208, and 219 include the structure such that capstan rollers and retainer belts enclose and retain the optical fiber core. However, all of these need not be the same structure. In other words, each of the retainer pieces 204E, 206, 208, and 219 may be substitutable as appropriate to a structure of a capstan roller pair, a structure of a retainer belt pair, and a structure that retains the optical fiber core by frictional force. Further effects and modifications can be easily contrived by one skilled in the art. Therefore, the wide scope of the aspects of the present disclosure is not limited to the above described embodiments and all manner of changes are allowable.

INDUSTRIAL APPLICABILITY

The method and device for screening an optical fiber core, and the method for manufacturing an optical fiber core of the present disclosure will be suitable for manufacture of optical fibers capable of suppressing damage in the resin coating layer.

REFERENCE SIGNS LIST

The present disclosure renders the effect of suppressing occurrence of damage in resin coating layers.

The present disclosure is not limited to the embodiments described above. The present disclosure encompasses a configuration obtained by appropriately combining the constituent elements described above.

Those skilled in the art can easily conceive additional effects and modifications. Thus, a broader aspect of the present disclosure is not limited to the specific details and the representative embodiment as represented and described above. Accordingly, various modification can be implemented without departing from a gist or a scope of a comprehensive concept of the disclosure defined by the attached claims and equivalents thereof.

The invention claimed is:

1. A method for screening an optical fiber core including a resin coating layer, the method comprising:
    a pre-strain applying step of adding a tensile force while feeding a portion of the optical fiber core retained at both ends of the portion, and applying a pre-tensile strain larger than zero and smaller than a guaranteed tensile strain set as a guaranteed value, the optical fiber core including the resin coating layer and being wound by a bobbin and fed out from another bobbin;
    a guaranteed strain applying step of adding a tensile force while feeding the portion of the optical fiber core retained at both ends of the portion and applied with the pre-tensile strain, and applying the guaranteed tensile strain only for a predetermined time; and
    a guaranteed strain releasing step of releasing the optical fiber core from the guaranteed tensile strain, wherein:
        at the pre-strain applying step, the pre-tensile strain is applied by applying tensile strain stepwise,
        at the pre-strain applying step, when applying the tensile strain in N stages (N is an integer of 2 or more), and a tensile force added at the n-th stage (n is an integer of 1 or more and less than N) is set to the tensile force n, the tensile force is added so as to achieve the relationship of (tensile force 1)>(tensile force (n+1)−tensile force n).

2. The method for screening an optical fiber core according to claim 1, wherein at at least one of the pre-strain applying step and the guaranteed strain applying step, a capstan roller and a retainer belt enclose and retain the optical fiber core.

3. The method for screening an optical fiber core according to claim 1, wherein at at least one of the pre-strain applying step and the guaranteed strain applying step, a pair of capstan rollers enclose and retain the optical fiber core.

4. The method for screening an optical fiber core according to claim 1, wherein at at least one of the pre-strain applying step and the guaranteed strain applying step, a pair of retainer belts enclose and retain the optical fiber core.

5. The method for screening an optical fiber core according to claim 1, wherein at at least one of the pre-strain applying step and the guaranteed strain applying step, the optical fiber core is retained by a frictional force acting between an outer circumferential surface of the capstan roller and the optical fiber core.

6. The method for screening an optical fiber core according to claim 1, wherein at the guaranteed strain releasing step, the optical fiber core is released from the guaranteed tensile strain stepwise.

7. A method for manufacturing an optical fiber core, the method comprising:
    a step of forming the resin coating layer on an outer circumference of an optical fiber to form the optical fiber core; and
    a step of screening the optical fiber core by utilizing the method for screening according to claim 1.

8. The method for screening an optical fiber core according to claim 1, wherein the optical fiber core is a thin optical fiber core which has a thickness of less than 125 μm.

9. The method for screening an optical fiber core according to claim 1, wherein the guaranteed tensile strain is 1.2% or more.

10. The method for screening an optical fiber core according to claim 1, wherein the pre-strain applying step includes:

a first tensile strain applying step of applying a tensile strain to the optical fiber core by adding a difference in rotation speeds between at least two capstan rollers; and a second tensile strain applying step of applying a tensile strain to the optical fiber core, after the first tensile strain applying step, by applying a load onto the optical fiber core retained at both ends.

* * * * *